United States Patent Office 2,728,678
Patented Dec. 27, 1955

2,728,678

PROCESS FOR DRYING SOLUTIONS CONTAINING CRYSTALLIZABLE MATERIAL, AND PRODUCT PRODUCED THEREBY

Paul F. Sharp, Piedmont, Calif., assignor, by mesne assignments, to Foremost Dairies, Inc., Oakland, Calif., a corporation of New York No Drawing. Application September 19, 1946, Serial No. 697,954

8 Claims. (Cl. 99—199)

This invention relates to a process for drying solutions containing crystallizable substances. These substances when converted to products are in a stable, relatively nonhygroscopic form, as distinguished from the markedly hygroscopic products which are produced when crystallizable substances are spray dried to a solid state according to procedures heretofore utilized. More particularly, this invention relates to the production of the crystallizable substance according to a novel procedure which serves to convert the substance into a product, at least the major portion of which is in the crystalline state.

This novel process comprises as essential steps the concentration of a liquid containing crystallizable material, seeding the concentrate with suitable crystals either with or without allowing the seeded concentrate to stand for a period sufficient to induce partial crystallization, and finally passing the seeded concentrate through a drying and solidification zone in which it is sprayed into a drying stream of gas such as air, carbon dioxide, or the like.

This invention provides a practical and economical method for rapidly drying solutions containing crystallizable substances such as, for example, inorganic salts or the crystallizable oxygen-bearing organic compounds such as the sugars, lactose, sucrose, and mannose, and the organic acids such as citric and tartaric acids. These substances may be treated either alone or when the substance is mixed with other substances. Sucrose solution, for example, is usually considered to be sucrose alone because the percentage of impurities is relatively small. On the other hand, lactose when present in skim milk, whey, or other milk products is considered mixed with other substances because the percentage of substances other than lactose is relatively large. The slower the velocity of crystallization and the more difficult the material is to crystallize, within reasonable limits, the more pronounced are the beneficial effects obtained by operating in accordance with applicant's new method.

The method of this invention is one which can be practiced with only inexpensive changes in equipment now in general use, and which will produce finished products which are high grade, stable, non-caking, and readily soluble.

It previously has been known that sucrose solutions or concentrated solutions which are relatively high in milk sugar or lactose content can be desiccated to form an anhydrous powder by the use of spray type driers. However, the hygroscopic nature of these products renders them unsuitable for storage and handling unless great precautions are taken to prevent absorption of moisture from the air. In a stabilized product such as is produced by the present method, the milk sugar, for example, is at least partially if not totally in a non-hygroscopic hydrate crystalline form and is relatively stable when exposed to the atmosphere.

Numerous methods for the production of whey products in the so-called stable form have been used. One such method is that of forming a powder, thereafter causing the powder to absorb water. The wetted product forms a hard cake which is then ground to again form a powder. This product is difficult to redissolve in water and, in addition, the proteins contained therein will quickly precipitate out of aqueous solutions. Another method which has been used consists in permitting a whey concentrate to stand for a sufficiently long time to permit the lactose to crystallize. This action results in the whole product becoming a mushy mass, which requires that the same be dried in trays or the like and thereafter pulverized. This procedure is objectionable as slow and productive of inferior products.

A known seeding method which has been used for the production of dried whey containing lactose partially in the crystalline form consists in evaporating whey to approximately 50% solids in an evaporator, and thereafter concentrating the same on the surface of drum driers to a solids content in the neighborhood of 85%. The 85% material is taffy-like in consistency and is removed from the drums by scraper knives and dropped onto a second set of rolls mounted therebeneath. This taffy-like material on passing through the bite between the rolls is pressed into a thin layer almost completely coating the drum surfaces. In the course of one revolution of the drums, the taffy-like material is converted into an essentially solid material. Some crystallization is induced therein by virtue of the fact that the previously dried layer has not been completely removed from the drums and therefore some lactose crystals are present to seed the taffy-like material before the same solidifies.

In the operation of that process, which only works with highly concentrated solutions having in the neighborhood of 85% solids, the product is carried substantially to complete dryness during which time it receives a rather severe heat treatment. Furthermore, since the product rapidly solidifies, there is no way to interrupt or control the crystallization.

Still another process comprises concentrating a material such as whey to a solids content of from 45% to 60%, and then spray drying the concentrate immediately thereafter, or before allowing the concentrate to stand for a period sufficient to permit crystallization to occur. Control of this process so that a product other than a so-called glass or gummy or syrupy mass is produced, has proven extremely difficult. Often the spray drier becomes fouled with gummy material which sticks to the sides of the equipment.

Masses produced by the above two processes are difficult to handle and require expensive equipment and a relatively long secondary drying time to obtain a finished product having the desired dryness.

Heretofore, as far as applicant knows, sucrose has been reduced to a crystalline product in commercial operations only by the long and involved process of repeated crystallization and concentration operation, but has never been reduced to a crystalline solid by spray drying.

It is an object of the present invention to provide a process according to which liquids containing crystallizable substances, after concentration, are reduced in a single drying operation to a product in which all of the product is in a substantially stable, non-hygroscopic form, as well as a product which readily redissolves.

Another object of the invention is to provide a spray drying process which reduces at least a major portion of the crystallizable substance to a powdery crystalline state as distinguished from the so-called glass produced heretofore.

It is an object of the present invention to provide a process according to which liquids containing milk sugar, after concentration, are reduced in a single drying operation to a product in which the milk sugar is in a substantially stable, non-hygroscopic form, as well as a product which readily redissolves.

Another object of the invention is to provide a spray drying process which is productive of crystalline alpha hydrate lactose in the resulting milk products, as distinguished from an anhydrous so-called glass form.

Another object of the invention is to provide a spray drying process having increased efficiency in heat utilization since, due to crystallization, the liquid evaporated is always removed from a saturated solution of relatively high vapor pressure rather than from highly concentrated supersaturated solutions of lower vapor pressure.

Another object of the invention is to provide a process which is easily controlled and which has increased capacity for equipment of a given size.

Another object of this invention is to provide a dry milk product containing lactose which has improved keeping qualities.

Another object is to produce a whole milk product having increased density and lower oxygen occlusion properties. These properties allow the oxygen normally included with the product when it is packed in metal shipping containers, to be more easily replaced by an inert gas, such as nitrogen.

Another object is to provide a process according to which cottage cheese whey may be spray dried to form a non-hygroscopic product containing crystalline hydrate lactose.

Further objects of this invention, not specifically enumerated, will readily appear to one skilled in the art as the following description proceeds.

Numerous difficulties, heretofore, have been encountered in spray drying materials containing crystallizable substances. Whereas successful operations have depended upon the skill of the operator in maintaining almost ideal conditions in the spray drying equipment, now it has been discovered that the solution to be dried may be treated prior to spraying and thus conditioned or altered to make control of the drying operation simple and to markedly broaden the range of drier operating conditions under which an acceptable commercial product may be produced.

In this new process, the solution or suspension which contains lactose, to use a specific example, is concentrated to a condition of supersaturation with respect to lactose. The supersaturated concentrate then is passed through a seeding zone in which the formation of a preferably large number of very small crystals is induced. The desirability of having a large number of such crystals formed is further explained below.

As a result of this practice, a substantial portion of the lactose present exists in a solid crystalline condition and acts subsequently to control crystallization when the solution is further concentrated and solidified in the drying step. This drying step consists of spraying the seeded concentrate into a drying zone, in which it is quickly dried.

A supersaturated condition which holds in solution more crystallizable material than would be retained therein if the liquid phase of the solution were in equilibrium with crystals of said material, may be reached by several methods. One method is that of concentrating an aqueous material by evaporating the water contained therein by placing the solution under a partial vacuum until the remaining aqueous phase is supersaturated with crystallizable material at the temperature at which the material is removed from the evaporating equipment. The other method is to concentrate the material to a point where the aqueous phase is not supersaturated and thereafter cooling the concentrate to a temperature lower than that at which the solution is supersaturated with respect to said crystallizable material. Supersaturation may also be reached by a combination of any of the above-stated methods. The temperatures employed and the method of concentration utilized preferably should be such that the material is not seriously discolored, or otherwise affected to the detriment of the palatability, odor, nutritive value or quality of the concentrate. In general, good results have been secured by conducting the evaporating action until the concentrate contains from 40% to 60% solids, such as, in the case of milk products, combined fats, minerals, proteins, and lactose. By properly controlling conditions, however, concentrations outside these limits can be utilized and the beneficial results of this process still retained.

A general concentration level is not, however, applicable to all products. For example, pure lactose solutions are saturated when holding only 16% lactose at 68° F. Lactose solutions, therefore, can be seeded and sprayed at any higher concentration and temperature relationship. On the other hand, when dealing with milk products, the preferred concentration for whole milk is in the range of from 50% to 52% total solids, whereas skim milk is preferably concentrated to about 55% total solids. Whey, on the other hand, is preferably concentrated until it contains from 50% to 60% solids. Salt is preferably concentrated to about 27% solids content or higher. Citric acid solutions are preferably concentrated in the range of 80% to 90% total solids.

The higher the concentration effected by this step the greater is the resulting supersaturation of the crystallizable material, and the easier and more extensive is the crystallization during seeding. However, the practical limits are established primarily by the ability of the concentrator to handle a viscous material without injuring the product through scorching or the like.

The maximum concentration which can be advantageously employed is further limited by the ability of the atomizer used to properly subdivide and spray the material and at the same time not to become plugged. The minimum concentration which may be employed is limited to that at which the solution becomes supersaturated with the crystallizable material.

When the material to be concentrated is whey formed as a by-product in the manufacture of cheese or by the removal of casein from skim milk with rennet or by acidulation, it is often desirable to adjust the pH by partial neutralization with lime. It is also generally desirable to pasteurize the whey prior to neutralization, in order to prevent further formation of lactic acid.

The second step of this process is that of enforcing the crystallization of the crystallizable material and according to which a multiplicity of crystals are produced in the concentrate. Numerous methods of seeding to induce crystallization are known and the choice of a particular method depends upon the requirements with respect to the production of numerous small crystals. For example, seeding may be accomplished by adding some comminuted crystals to the supersaturated solution and then agitating, or it may be accomplished by recycling a portion of an already seeded product high in crystal content, or thirdly, crystallization may be induced by the method disclosed and claimed in applicant's Patent No. 2,565,097, issued August 21, 1951, which is preferred since according to it no extraneous material is added to the product and it permits control of both the size and number of crystals. According to that method, the solution is passed in contact with a seeding surface and thereafter it has its contact therewith repeatedly interrupted by mechanical means, thus inducing the growth of a large number of small crystals which are removed from the environment of the seeding base almost as rapidly as they are formed.

In order to practice the present invention, it is desirable to have a fairly large number of crystals of the desired material in the concentrate. Theoretically, it is desirable to have enough crystals in the seeded concentrate to provide at least one crystal to each spray particle since no continuous liquid phase exists, when spraying, through which crystal growth can propagate. This would approach having an average of 150 million small crystals per cubic centimeter present at the time atomizing is being carried out. Approaching this condition is desirable, but beneficial effects may be obtained when only the larger portion or when only half or less of the sprayed particles contain crystals.

The above partial crystallization methods are capable of producing 50 million or more crystals per cubic centimeter per pass through a suitable crystallization zone and as many as 2000 million crystals per cubic centimeter when the material is passed through a surface contact type of device.

Varying degrees of beneficial results may be obtained by this process, depending upon the extent of the seeding agitation and the length of time the product is allowed to stand after seeding is effected. For example, if sufficient amounts of powdered seed crystals are added to the concentrate, the seeded material may be sent immediately to the drying operation. When using more economical and smaller amounts of seeding material, the seeded concentrate must be held in the crystallization zone for a longer period; that is, for a sufficient time to permit a predetermined degree of controlled crystallization to occur. This period of time may vary from a matter of minutes to several hours or longer.

The crystallization time varies with every product and is dependent upon a number of factors, namely, the degree of concentration of the starting material, the degree of agitation, the manner of operating the drying chamber, that is to say, whether the same dries slowly or rapidly, the degree of subdivision of the material atomized and fed to the drier, the period during which the sprayed particles remain suspended in the drying air, and moisture content and other characteristics of the final product. If one desires to obtain a dried product of only reasonably low moisture content, such as that which is characteristic of products used for animal feed, the seeding operation need not be as extensive and may be carried out by merely flowing the concentrated whey or the like in contact with crystalline lactose. Furthermore, the greater the tendency of the drying material to remain suspended in the heated air, the less extensive has to be the pre-crystallization. If longer periods of suspension are used, then proportionately smaller quantities of seeding crystals are necessary, within reasonable limits.

The next step of this process is to spray-dry the seeded concentrate under such conditions that a friable product or powder is secured which has the desired moisture content. The spray drying operation is carried out by atomizing the concentrate and then contacting the atomized particles with a drying gas which is introduced into the drier at a temperature generally higher than the temperature of the liquid being sprayed if the liquid is not too highly concentrated. When the solutions are highly concentrated, as for example, sucrose solutions in the range of 92% total solids, the temperature of the gas fed to the desiccator may be somewhat below the temperature of the liquid being sprayed. The temperature of the gas passing through the desiccator generally falls to a temperature within the range of from 160° F. to 330° F. At this temperature and when abetted and induced by the crystals present, crystallization of the material can take place simultaneously with the removal of water and at a relatively rapid rate.

The product from the spray drier may or may not contain an amount of moisture requiring an after drying treatment. For example, solutions of sugars alone may be finally dried by introducing a small amount of warm gas into the bottom of the powder collecting cyclone where the powder and high relative humidity gas from the drier are separated. On the other hand, when drying powdered whole milk which contains fats and proteins in addition to lactose, to a particularly low moisture content, final drying may be necessary to reduce the free moisture content to 3% or less, without removing the water of crystallization.

Suitable equipment for carrying out the above described process is well known.

The pre-concentration of dilute solutions containing lactose to the desired degree can be effected readily by any one of a number of ways, such as by the use of a vacuum pan or the like. A continuous supply of concentrate can be obtained from a multiple effect evaporator.

The seeding step may require some flow delaying means such as a storage chamber provided with agitation means. If the addition of seed crystals is the seeding method used, the powdered crystal material may be fed directly into the concentrate or introduced in a mother liquid, fed in by suitable mechanism, such as by a hopper; or by a screw conveyor, pump, or similar device. Such device should have suitable controls to insure delivery of the desired quantities of seed crystals to the concentrate. If seeding is accomplished by the method and means described in applicant's Patent No. 2,565,097 the equipment there disclosed should be installed after the concentrator and may or may not be equipped with a storage tank.

A suitable apparatus for carrying out the spray drying operations is any standard powdered milk spray drier. Such drier should comprise a suitable chamber having one or more conduits providing for the introduction of hot air or like drying gases. If a cone type drier is used, it may have at or near the axis thereof a centrifugal atomizer to which the seeded concentrate is supplied. In place of a centrifugal atomizer, other types of atomizing equipment can be employed such as, for instance, a high pressure pump for delivering the material through an atomizing nozzle.

The optimum inflow and outflow temperatures of the drying gas will depend upon the solids content and character of the concentrate being processed and such temperatures can be determined by experiment. In general, there is a substantial drying range within which the desired results may be obtained.

When pumping the seeded concentrate to the spray device, some heat may be imparted to the product as a result of the action of the pump. A limited amount of heat is not harmful provided that it does not result in the dissolution of any appreciable part of the small seed crystals of the lactose present.

Products prepared by this method may be recognized and readily distinguishable from spray dried products prepared according to prior art methods. When examined by means of the microscope and polarized light it will be seen that the product of this process is made up of substantially spherical pellets easily identified as being crystalline. On the other hand, customary spray dried products are relatively devoid of crystalline material and roll dried material is not spherical in form but is made up of angular material produced by fracture, resulting from grinding.

The following examples further illustrate the present invention:

*Example I*

Whole milk of about 12.5% solids content, including butterfat, is concentrated in a triple effect evaporator until it has approximately 51% total solids. The concentrate should be removed from the evaporator at a temperature of about 110° F. and then cooled to about 70° F. by flowing the same over a surface cooler. To approximately 1500 pounds of the concentrated whole milk, 6 pounds of powdered lactose seed crystals should be added. The mixture is then agitated for almost three hours in a tank, after which it will be found that the product contains about 225 million crystals per cubic centimeter.

The concentrate may then be spray dried.

The following is a comparison of the characteristics, as determined by standard tests, of two whole milk powders, one of which was produced according to this invention and the other of which was produced by a method not using a seeding step:

| Product | Density, gm./cc. | Peroxide Number (Samples Stored in Air at 55° C.) | Oxygen Content after Single Inert Gassing (Average of 6 cans each) |
|---|---|---|---|
|  |  |  | Percent |
| Regular Unseeded | 0.652 | 7 after 8 days | 3.65 |
| Seeded | 0.664 | 1 after 18 days | 2.75 |

The product formed by this invention obviously is more dense, more readily reduced to storage conditions by gas treatment and has much better keeping properties.

*Example II*

Sour whey from cottage cheese manufacture having a relatively high lactic acid content and therefore a lower lactose content, of the type almost impossible to process into a stable powder by the unseeded spray drying methods, may have its pH adjusted with lime to approximately 6.5, after which it may be concentrated in a multiple effect evaporator to approximately 55% solids. The concentrate so formed may then be removed from the evaporator at a temperature of about 118° F. and then cooled to about 80° F. by flowing the same over a surface cooler.

About four ounces of lactose crystals per one hundred pounds of concentrated whey may then be added and the mixture stirred for about one hour in a tank. The seeded material next may be atomized in the spray drier having an inflow drying gas temperature of about 310° F. and an outflowing gas temperature of about 140° F. From the bottom of such a drier may be withdrawn a white granular stable whey product.

When a whey product similar in all respects except that it has not been seeded is spray dried, it will adhere to the sides of the drier in the form of a tough plastic taffy-like mass which can be removed only with great difficulty and which accumulates in large blocks often weighing several pounds each.

The product formed by this improved process is of high quality and is well suited for use as a food for humans or as an animal food. It is not hygroscopic when exposed to the atmosphere and need not be packed in air-tight cartons or metal containers.

*Example III*

A sucrose solution of 85% solids content may be concentrated in an evaporator to 93% total solids. When the temperature has been lowered to 250° F., the solution is supersaturated with sucrose and may be extensively seeded with, roughly, one pound of seed crystal sucrose per 100 pounds of concentrate to put the mixture in condition for immediate spraying.

The seeded mixture may then be atomized into a spray drier having an inflow gas temperature of about 280° F. and an outflowing gas temperature of about 234° F. From the bottom of this conical drier may be withdrawn a white crystalline powder and the drying medium which at this stage has a high relative humidity.

This powder-gas mixture from the drier may be separated in a powder recovery cyclone. A small amount of hot gas may be fed into the bottom of this cyclone to insure complete surface dryness of the powder.

White powder recovered from the cyclone is a fine, white, almost exclusively crystalline product of quite uniform particle size.

*Example IV*

A salt solution may be concentrated to, roughly, 27% solids at atmospheric pressure. When the solution has been cooled to 180° F. the solution is supersaturated. About 1 pound of pulverized salt per 100 pounds of solution may then be added and the mixture stirred for a few minutes in a tank. The seeded material next may be atomized into the spray drier having an inflow drying gas temperature of about 330° F. and an outflowing gas temperature of about 235° F.

Powder and gas from the drier may be separated in a powder collecting cyclone. The powder withdrawn from the bottom of this cyclone is a fine, white, granular and stable powder which readily redissolves in liquids.

*Example V*

A concentrated solution of citric acid may be prepared by mixing together citric acid and water in the ratio of 108 pounds of acid per each 8 pounds of water, and heating the mixture to about 230° F. When the solution has been cooled to about 200° F. crystallization may be initiated and the mixture may be treated until a large number of minute crystals are formed.

The seeded mixture which still has a temperature in the neighborhood of 200° F. may then be atomized into a spray drier having an inflow gas temperature of about 246° F. and an outflowing gas temperature in the powder-gas mixture of about 208° F.

The powder-gas mixture may be separated in a powder recovery cyclone where the powder was treated as explained in Example III.

The powder recovered after the above treatment is a fine white, crystalline powder which readily redissolves in liquids.

A citric acid solution of the same concentration sprayed into the drier under substantially identical conditions as the above example except without being seeded, formed a solid solution or so-called glass in the drier. Very little of this material will become a dry powder which may be collected in the cyclone. The material which is recovered is not crystalline and is very hygroscopic.

In the appended product claim, the term "an essentially dry milk powder" is intended to include both whole milk and skim milk powders, as well as other powders derived from milk which contain milk lactose and protein.

What is claimed is:

1. The process of spray drying a product containing in solution a constituent capable of existing, when solidified, either in a crystalline or in a glass form, and which heretofore, when solidified by spray drying, has existed in a glass form, which comprises the steps of first crystallizing from said solution a portion of said constituent to form in admixture with said solution a number of minute seed crystals in quantity bearing that relation to the number of droplets to be formed during spray drying of said solution, which is productive of substantially at least one seed crystal nucleus for each droplet to be so formed, thereafter spraying said solution in a drying atmosphere and thereby solidifying the individual sprayed droplets thereof, and during such solidification of the respective droplets of said solution, crystallizing in a substantial portion thereof, by the action of the crystal seed present therein, said contained constituent.

2. The process as defined in claim 1, further characterized in that the step of first crystallizing from said solution a portion of said constituent is carried out by the addition of seed crystals of said constituent to said solution.

3. The process as defined in claim 1, further characterized in that the crystallizable constituent of the solution treated is sugar.

4. The process as defined in claim 1, further characterized in that the crystallizable constituent of the solution treated is salt.

5. The process as defined in claim 1, further characterized in that the crystallizable constituent of the solution treated is lactose.

6. The process as defined in claim 1, further characterized in that the substance treated is milk and the crystallizable constituent is lactose.

7. The process as defined in claim 1, further characterized in that the substance treated is whey and the crystallizable constituent is lactose.

8. An essentially dry milk powder, made up of particles which are substantially spherical in shape, and which has substantially all of its protein content in a form capable of producing a stable suspension in water, and also having therein a substantial portion of its lactose content in the form of identifiable alpha lactose crystals.

References Cited in the file of this patent

UNITED STATES PATENTS

| | | |
|---|---|---|
| 2,016,592 | Chuck | Oct. 8, 1935 |
| 2,044,194 | Visser | June 16, 1936 |
| 2,088,606 | Peebles et al. | Aug. 3, 1937 |
| 2,188,506 | Hall | Jan. 30, 1940 |

OTHER REFERENCES

Hunziker: "Condensed Milk and Milk Powder," 6th Ed., March 1946, pages 23, 26, 409, 435 and 436.